Dec. 25, 1951     K. H. BUTLER     2,579,900
IMPROVED CALCIUM HACO-PHOSPHATE PHOSPHOR
Filed May 7, 1948
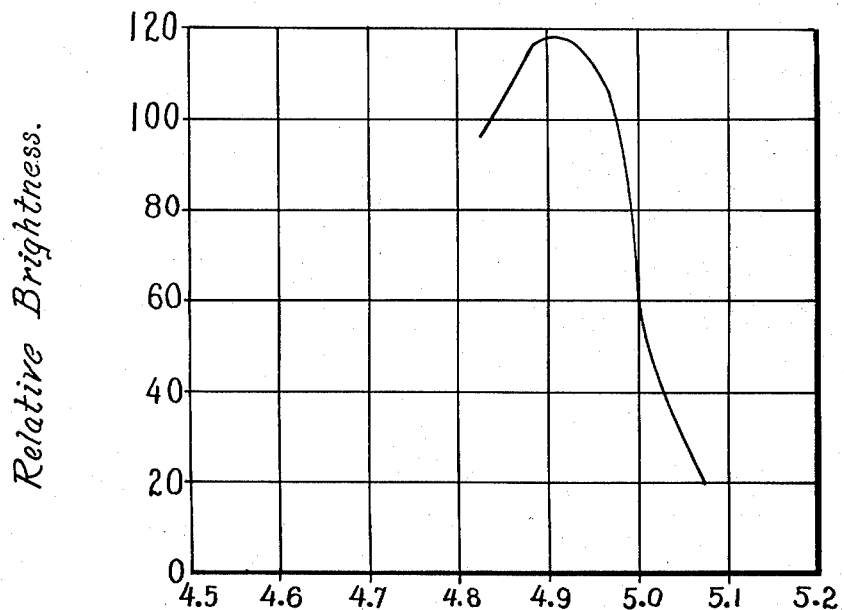
Ratio of Calcium plus Manganese to phosphorus.
Keith H. Butler,     INVENTOR.
BY *Lawrence Burns*,
ATTORNEY Patented Dec. 25, 1951

2,579,900

UNITED STATES PATENT OFFICE 2,579,900

IMPROVED CALCIUM HALO-PHOSPHATE PHOSPHOR

Keith H. Butler, Marblehead, Mass., assignor to Sylvania Electric Products Inc., Salem, Mass., a corporation of Massachusetts Application May 7, 1948, Serial No. 25,692

3 Claims. (Cl. 252—301.4)

This invention relates to fluorescent phosphors and their methods of preparation, particularly with respect to the halo-phosphates.

Calcium halo-phosphate is such a phosphor and has the chemical formula $3Ca_3(PO_4) \cdot CaX_2$, where X represents a halide, which must be a chloride or fluoride, and the remaining symbols have their usual chemical meaning. The phosphor may be activated for example by antimony alone or by antimony combined with managanese. This phosphor has been previously prepared by mixing manganous phosphate, antimony trioxide, calcium, fluoride and/or calcium chloride with calcium phosphate having substantially the composition of tri-calcium phosphate. This calcium phosphate was prepared by reacting calcium carbonate with phosphoric acid in stoichiometric amounts. The resulting calcium phosphate was substantially tri-calcium phosphate but contained indeterminate amounts of other phosphates which made the calcium phosphorus ratio variable from batch to batch. The proportions of calcium to phosphorus are very critical and consequently phosphors made by this method varied considerably in brightness, in emissive color and other characteristics from batch to batch, hindering its commercial use.

To make uniform and reproducible phosphors of proper characteristic was an object of my invention. To achieve this I used a process in which calcium carbonate and secondary calcium phosphate, often called di-basic calcium phosphate, are used as the sources of calcium and phosphate. Both of these materials can be readily precipitated from calcium chloride with ammonium carbonate or di-ammonium phosphate as the precipitating agent and the precipitates are uniform in composition, coming down with stoichiometric ratios. The third ingredient, manganous carbonate, can also be prepared by precipitation in very exact composition. This invariance of composition facilities the preparation of phosphors with the precise ratio of calcium to manganese to phosphate which is desired for optimum brightness and particle size. The use of calcium carbonate, calcium phosphate and manganous carbonate provides a 3-component system which allows independent variation of the calcium, phosphate, and manganese proportions. By using calcium halide and antimony tri-oxide the proportions of the halide and antimony would also be fixed with the same independent precision.

A result of my invention is a calcium halo-phosphate of improved uniformity, brightness and color characteristics. I find a small but definite excess of phosphate and fluoride over the stoichiometric proportions to be necessary for maximum brightness and efficiency.

Other objects, features and advantages of the invention will be apparent from the following specification, taken in connection with the accompanying figure, which is a graph of brightness against the total gram-atoms of calcium plus manganese per 3 gram-atoms of phosphate.

I have discovered that for maximum efficiency it is important moreover to control the ratio of calcium halide to tri-calcium phosphate to precisely the proper amounts. I have discovered also that to obtain maximum efficiency together with relatively fine particle size, it is essential to control rather exactly the ratio of the sum of the calcium and manganese atoms to the phosphate ion so that the ratio Ca+Mn/P is somewhat less than 5.0/3.0. Obtaining this exact ratio with prior art calcium phosphate is very difficult. The exact adjustment of a mixture of phosphoric acid and calcium carbonate to give the desired ratio Ca/P within 1% is very difficult to do on any large scale. Besides this difficulty of obtaining the exact ratio, the physical characteristics of the calcium phosphate are very undesirable and great trouble is encountered in filtering and washing without hydrolysis and loss of phosphate. The preparation of tri-calcium phosphate by precipitation from a soluble calcium salt with ammonium phosphate is also difficult to control so as to give the desired ratio of calcium to phosphorus.

In the preparation of this phosphor there are five independent variables; namely, calcium, phosphate, halide, antimony, and manganese. I have found that by use of five separate raw materials, it is possible to get an independent control of each of the five variables. These raw materials are: calcium carbonate, secondary calcium phosphate, manganous carbonate, calcium halide, and antimony trioxide. Using these raw materials, I have prepared phosphors with different ratios of calcium plus manganese to phosphorus which is expressed in the table below as the total gram atoms of calcium plus manganese for each three gram-atoms of phosphorus. These powders were prepared by dry blending appropriate amounts of the five constituents and hammer-milling the blend. The powders were fired in covered 80 cc. porcelain crucibles for 1 hour at a temperature of 1130° C. The relative brightness and the particle size of the finished phosphors are shown in the table below:

| Total Gram-Atoms Ca Mn | Brightness | Particle Size |
|---|---|---|
| 4.82 | 98 | 16.2 |
| 4.87 | 109 | 13.1 |
| 4.92 | 118 | 9.1 |
| 4.97 | 106 | 6.3 |
| 5.00 | 57 | 4.8 |
| 5.07 | 20 | 5.6 |

In the foregoing table the total gram-atoms of calcium plus manganese are expressed per 3 gram-atoms of phosphorus, and the brightness is expressed in relative units and the average particle size in microns. The amount of manganese used per three-gram-atoms of phosphorus in obtaining the above data was 0.10 gram-atoms. The halide was fluoride except for 10 mol percent which was chloride. The antimony used in the raw material blend was 0.10 gram mols of $Sb_2O_3$ for each 3 gram-atoms of phosphorus. All gram-atom ratios are per 3 gram-atoms of phosphorus.

As a specific example of preparing a phosphor according to my invention I may take a water solution of C. P. ammonium phosphate having a concentration for example, of 2.3 mols per liter, although this is not critical, and being sufficient to produce the proper excess of phosphate. The temperature of the ammonium phosphate solution may be 65° C., for example. This may be added to a C. P. calcium chloride solution with a concentration of 4.0 mols per liter to cause the precipitation. The precipitate is of course filtered, washed thoroughly with water until substantially free of ammonium chloride and dried in a manner customary in the art. The calcium carbonate may be produced similarly by using an ammonium carbonate solution as the starting vehicle instead of the ammonium phosphate solution. The manganous carbonate can also be precipitated from the latter solution by adding manganous chloride. The calcium carbonate, secondary calcium phosphate and manganous carbonate in the form of powders of small particle size, made as above described, may then be mixed with antimony trioxide and calcium halide in similar powdered form and in the following approximate proportions:

| | |
|---|---|
| Ca+Mn | 4.9 |
| P | 3.0 |
| X | 1.04 |
| Sb | 0.05–0.30 |
| Mn | 0.00–0.50 |

The material of these component powders may be dry blended in the proper amounts and hammermilled to form an intimate mixture. They should then be fired as previously described in covered crucibles. The time and temperature of firing will be determined by the size of crucible and the exact composition of the raw material blend.

In following my invention, the amount of manganese present is determined entirely by the manganese carbonate, the antimony by the antimony trioxide, the halide by the calcium halide, and the phosphate by the secondary calcium phosphate. Two of these materials also introduce calcium, but in an amount insufficient for the formula previously given. The additional amount of calcium can be made up by the addition of the proper amount of calcium carbonate, which therefore acts as a means of fixing the calcium content separately, and thereby securing a fixed and definite calcium/phosphorus ratio. The carbonate, of course, gives off carbon dioxide on firing, reducing to the oxide. Other compounds that give off gas and reduce to the oxides on heating could also be used, provided that the gas given off is not one which would react with any of the other materials in a deleterious manner. Similarly other compounds of antimony which decompose to form the trioxide may be used instead of antimony trioxide. Unless the secondary calcium phosphate is the only phosphate compound used, the phosphate ratio will be varied, and independent control of each compound will not be obtained.

Some of the calcium may be replaced by strontium without materially affecting the characteristics of the phosphor. Strontium carbonate can be used instead of calcium carbonate, for example, with calcium introduced through the secondary calcium phosphate.

The phosphor without manganese will fluoresce blue. With increasing manganese the fluorescence becomes whiter, and with the top manganese content given above, becomes red.

The halide should be present in excess of the phosphate, by a few per cent, preferably 4%, although 10% has been used successfully. A deficiency of halide will reduce the phosphor brightness.

What I claim is:

1. A phosphor consisting essentially of a mass of calcium halo-phosphate, activated by manganese and antimony in combination, in which the mol ratio of calcium plus manganese to phosphate is substantially 4.9 to 3.0 and in which secondary calcium phosphate is substantially the only source of calcium phosphate in the raw materials from which the phosphor is formed.

2. A phosphor consisting essentially of a mass of calcium halo-phosphate activated by manganese and antimony in combination in which the mol ratio of calcium-plus-manganese to phosphate is substantially 4.9 to 3.0, and in which the ratio of halide to phosphate is a few percent in excess of stoichiometric and in which secondary calcium phosphate is substantially the only source of calcium phosphate in the raw materials from which the phosphor is formed.

3. The method of preparing a calcium halo-phosphate phosphor, which includes the steps of mixing calcium carbonate, secondary calcium phosphate, calcium fluoride, and manganese and antimony compounds in proportions necessary to form said phosphor with a mol ratio of calcium-plus-manganese to phosphorus of substantially 4.9 to 3.0, and firing the same.

KEITH H. BUTLER.

REFERENCES CITED

The following references are of record in the file of this patent:

UNITED STATES PATENTS

| Number | Name | Date |
|---|---|---|
| 2,476,654 | Froelich | July 19, 1949 |

FOREIGN PATENTS

| Number | Country | Date |
|---|---|---|
| 578,192 | Great Britain | June 19, 1946 |